(12) United States Patent
Statkus

(10) Patent No.: US 8,528,149 B2
(45) Date of Patent: Sep. 10, 2013

(54) MAGNET-ASSISTED MOISTURE REMOVAL DEVICE

(76) Inventor: Daniel J Statkus, Montgomery, IL (US)

( * ) Notice: Subject to any disclaimer, the term of this patent is extended or adjusted under 35 U.S.C. 154(b) by 0 days.

(21) Appl. No.: 13/212,597

(22) Filed: Aug. 18, 2011

(65) Prior Publication Data

US 2012/0042464 A1    Feb. 23, 2012

Related U.S. Application Data

(60) Provisional application No. 61/374,763, filed on Aug. 18, 2010.

(51) Int. Cl.
*A47L 1/09* (2006.01)

(52) U.S. Cl.
USPC .......................... 15/220.2; 15/214; 15/104.94

(58) Field of Classification Search
USPC .................... 15/104.94, 220.2, 214
See application file for complete search history.

(56) References Cited

U.S. PATENT DOCUMENTS

| | | | | | |
|---|---|---|---|---|---|
| 2,507,559 | A | * | 5/1950 | D'Andrea | 15/220.2 |
| 2,634,444 | A | * | 4/1953 | Coleman | 15/220.2 |
| 3,600,737 | A | * | 8/1971 | Shore | 15/104.001 |
| 3,609,793 | A | * | 10/1971 | Kaftan | 5/220.2 |
| 3,759,621 | A | * | 9/1973 | De Carlo | 401/10 |
| 4,480,352 | A | * | 11/1984 | Eggett | 15/214 |
| 4,977,637 | A | * | 12/1990 | Demers | 15/104.001 |
| 5,515,570 | A | * | 5/1996 | Muscroft | 15/220.2 |
| 5,988,109 | A | * | 11/1999 | Rofen | 119/245 |
| 6,206,978 | B1 | * | 3/2001 | Tsui | 134/8 |
| 6,221,170 | B1 | * | 4/2001 | Marzban et al. | 134/6 |
| 6,348,104 | B1 | * | 2/2002 | Bakker | 134/6 |
| 6,634,052 | B2 | * | 10/2003 | Hanson | 15/220.2 |
| 6,865,771 | B2 | * | 3/2005 | Hanson | 15/220.2 |
| 7,313,840 | B2 | * | 1/2008 | Watkins | 15/103 |
| 7,313,841 | B2 | * | 1/2008 | Huang | 15/220.2 |
| 7,506,612 | B2 | * | 3/2009 | Enoch et al. | 119/264 |
| 7,784,428 | B2 | * | 8/2010 | Deng | 119/264 |

\* cited by examiner

*Primary Examiner* — Monica Carter
*Assistant Examiner* — Michael Jennings

(57) ABSTRACT

A moisture removal device is disclosed. In one embodiment, the device includes a first wiper and a second wiper that are magnetically attracted to each other. Each wiper may include a shell layer and an absorber layer that collectively assist with removing moisture and/or dirt or other materials from an object such as a mask, protective eyewear, glasses, or the like. The device can be placed on the object such that one wiper is on an outside surface and one wiper is on an inside surface. The device can be used to remove moisture from one or both surfaces without requiring a user to remove the protective eyewear from his or her head.

11 Claims, 7 Drawing Sheets

MAGNET-ASSISTED MOISTURE REMOVAL DEVICE

CROSS-REFERENCE TO RELATED APPLICATIONS

This application claims the benefit of U.S. Ser. No. 61/374,763 filed Aug. 18, 2010.

BACKGROUND OF INVENTION

The present invention relates to a moisture removal device, and particularly to a moisture removal device that can be used in conjunction with, for example, a helmet or protective eyewear.

SUMMARY OF INVENTION

Persons who participate in recreational sports such as snowmobiling, paintballing, motorcycling, skiing, and the like know well that moisture tends to collect on the protective eyewear or lenses associated with the sport. Often, the moisture will collect on the inside of the protective eyewear, causing the participant to stop what he is doing, remove the eyewear, and wipe and clean it in order to improve visibility. In a competitive environment, a participant is often unwilling to sacrifice the time it takes to cleanse the eyewear. Moreover, in some situations, such as paintball, it may be dangerous to the user to remove the eyewear. The present disclosure relates to one or more of the following features, elements or combinations thereof.

A moisture removal device is disclosed. The device illustratively includes a first wiper and second wiper that are magnetically attracted to each other. Each wiper may include a shell layer and an absorber layer that collectively assist with wiping moisture and/or dirt or other materials from an object such as a mask, protective eyewear, glasses, or the like. The device can be placed on the object such that one wiper is on an outside surface and one wiper is on an inside surface. The device can be used to remove moisture from one or both surfaces without requiring a user to remove the protective eyewear from his or her head.

Additional features of the disclosure will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
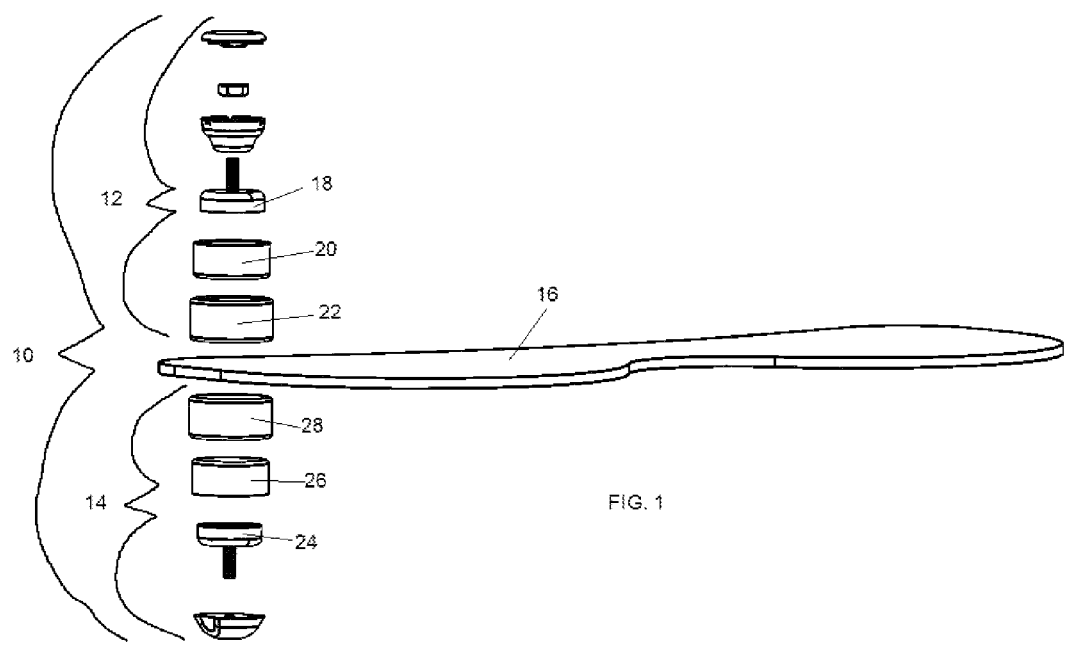
FIG. 1 is an exploded view of one embodiment of the present invention as it would be applied to an object such as protective eyewear.
Figure 2:
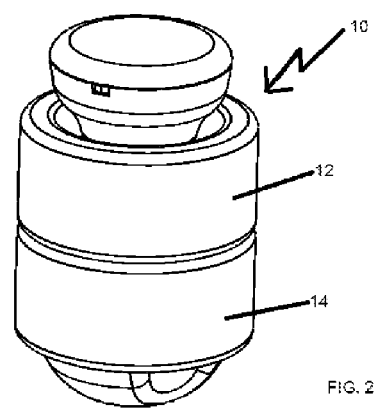
FIG. 2 is a perspective view of the embodiment shown in FIG. 1.
Figure 3:
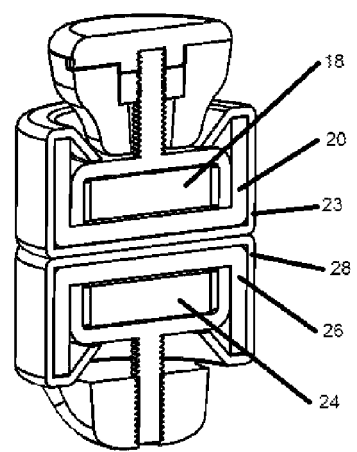
FIG. 3 is a cutaway view of the embodiment shown in FIGS. 1-2.
Figure 4:
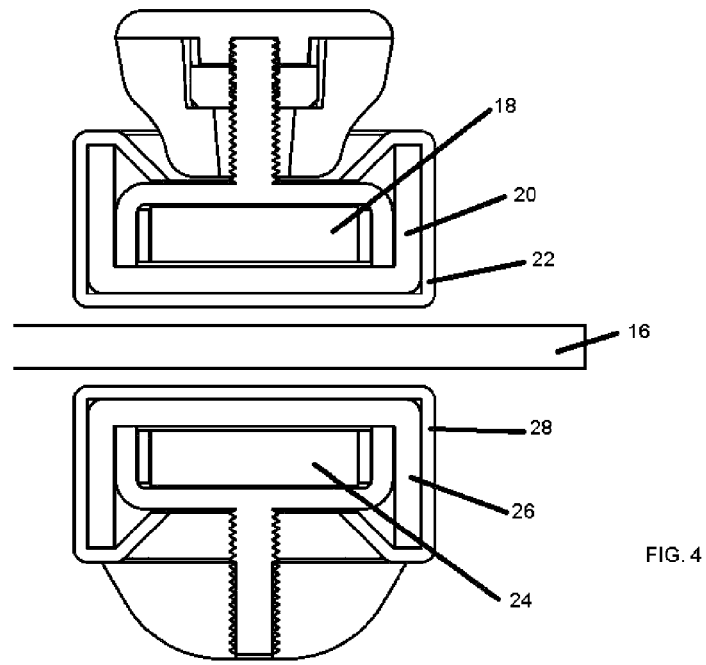
FIG. 4 is another cutaway view of the embodiment shown in FIGS. 1-3, showing an object positioned between two parts of the embodiment.

One embodiment of the present disclosure is shown in FIGS. 1-3 in the form of a moisture removal device 10 having a first wiper 12 and a second wiper 14. In the illustrated embodiment, first wiper 12 and second wiper 14 are substantially similar in size, and are configured to be placed on opposite sides of an object 16 to be wiped.

As contemplated herein, object 16 may be a mask, a lens, a part of a helmet, protective eyewear, glasses, or any other item that might benefit from having vision-impairing moisture or dirt removed. Advantageously, moisture removal device 10 provides the ability to remove moisture and/or dirt from both sides of object 16 at the same time.

As can be seen in FIGS. 1 and 3, first wiper 12 illustratively includes a magnet 18, an absorber 20, and a shell 22. Shell 22 may be composed of, for example, cloth, mesh, netting, sponge, or any other type of preferably flexible material that could be passed over an object 16 and provide the ability to cleanse or wipe the object 16. Absorber 20 may be, for example, a compressed sponge, an absorbent cloth, cotton, or any other type of material that can absorb and retain certain materials that might be found on object 16. In the contemplated embodiment, absorber 20 is formed as a single layer of material that can be placed adjacent magnet 18. Shell 22 is also contemplated to be a single layer of material that can be placed adjacent absorber 20.

Similarly, second wiper 14 can comprise a magnet 24, an absorber 26, and a shell 28. The materials used for each component of second wiper 14 can be identical to those used in first wiper 12. It is contemplated that magnet 24 and magnet 18 are positioned such that their opposite polarities face each other, and therefore attract each other. In the illustrated embodiment, such attractive forces cause first and second wipers 12, 14 to hold positions opposite each other on object 16 even when only one of the wipers 12, 14 is urged to move. It is also contemplated that one of magnets 18, 24 could be substituted with a magnetic material such as a ferrous metal, so that the remaining magnet 18, 24 would still be magnetically attracted to the opposing wiper due to the ferrous metal.

As disclosed herein and visible in the drawings, one presently contemplated shape for wipers 12, 14 is a cylindrical disk. However, it should be understood that other shapes and configurations for wipers 12, 14 are within the scope of the disclosure. For example, wipers 12, 14 may be squared, rectangular, linear, or any other shape that permits both a wiping function and an ability to reside on object 16 during non-use.

Figure 5:
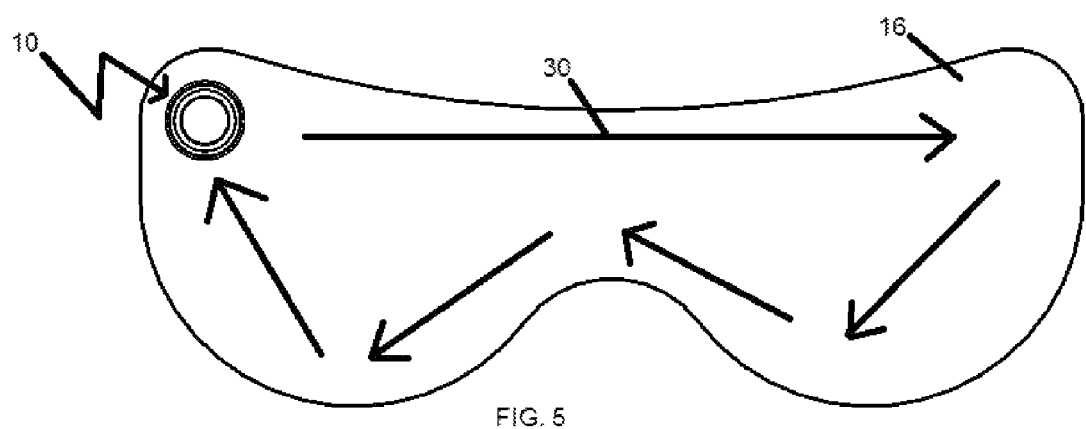
FIG. 5 is a front view of one embodiment as it might be applied to protective eyewear.
Figure 6:
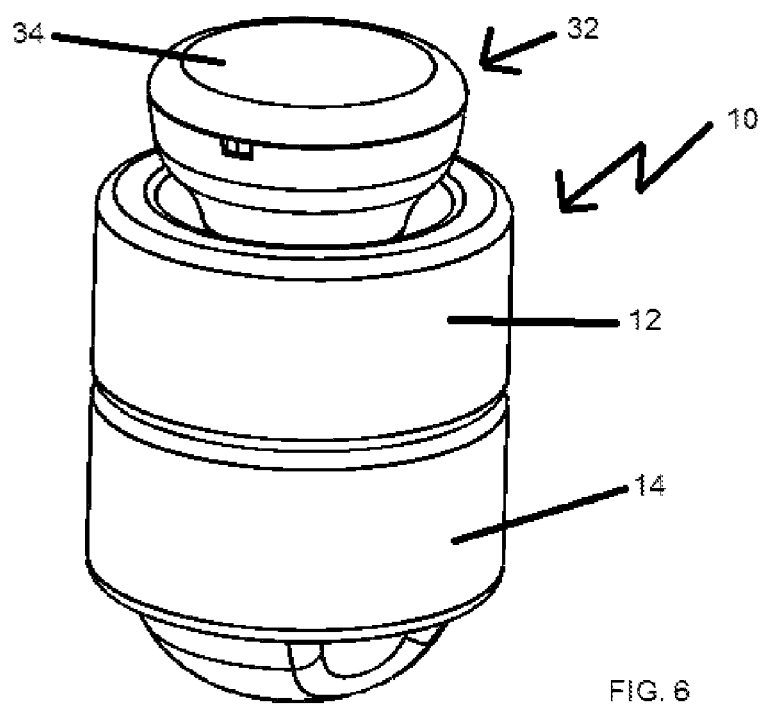
FIG. 6 is a perspective view of another embodiment of the invention.

During non-use, it is contemplated that device 10 can be moved to a corner or non-intrusive area of object 16. For example, as can be seen in FIG. 5, device 10 may be positioned in an area of object 16 that is off to the side and not intrusive of the vision of a user. It is further contemplated that device 10 may be urged around object 16 in a certain pattern, such as that shown by arrows 30 in FIG. 5.

Another embodiment of the present invention can be seen in FIGS. 6-9. In such an embodiment, wiper 12 can include a handle portion 32 that facilitates a user's movement of wiper 12. In the illustrative embodiment, it is contemplated that a top surface 34 may be configured to display a logo or other indicia. Such a logo or other indicia may be, for example, a product label, assembly instructions, a personal identifier or may alternatively be advertising or branding for a third party.

Figure 7:
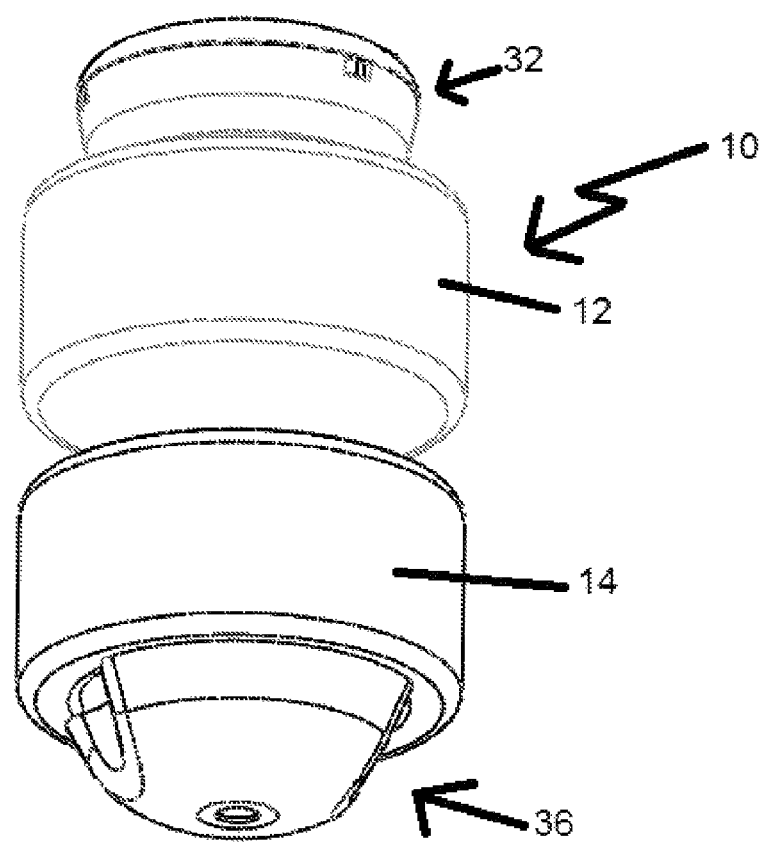
FIG. 7 is a further perspective view of the embodiment shown in FIG. 6.

Wiper 14, visible in FIG. 7, may include a rounded portion 36 rather than a handle portion. Rounded portion 36 provides a low profile and is therefore less likely to scratch or inconvenience the user. The rounded portion may be made of rubber, cloth or any other suitable material.

Figure 8:
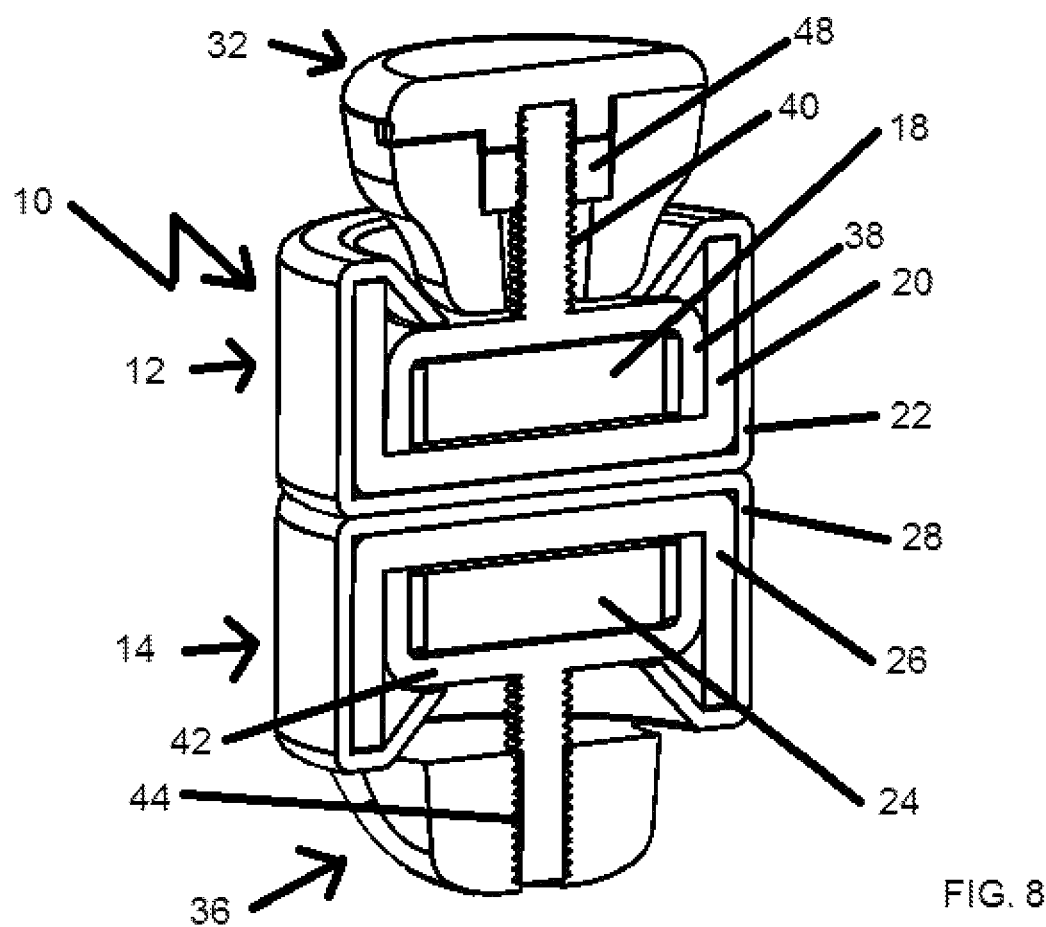
FIG. 8 is a cutaway view of the embodiment shown in FIGS. 6-7.

As can be seen in FIG. 8, a magnet housing 38 may be connected to magnet 18. Such a magnet housing can include a threaded portion 40 that provides a means for magnet housing 38 to securely connect to, for example, handle portion 32. Magnet housing may be constructed of metal or any other suitable, hard material.

Second wiper 14 may be similarly constructed, such that a magnet housing 42 with a threaded portion 44 is provided. The disclosed construction for first and second wipers 12, 14 may be useful in securing shells 22, 28 to their respective wipers 12, 14. For example, a portion of shell 22 may be positioned between magnet housing 38 and handle portion 32. When handle portion 32 is tightened on threaded portion 40, handle portion 32 may be caused to pinch shell 22 between magnet housing 38 and handle portion 32, thereby holding it in place. When it is desired to replace shell 22, handle portion 32 can be unthreaded and shell 22 exchanged for a replacement. Shell 28 may be replaced in a similar fashion.

Figure 10:
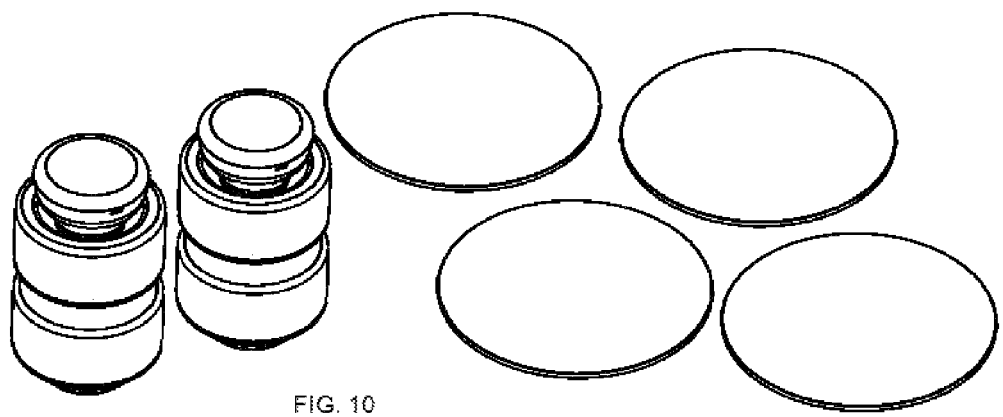
FIG. 10 is a perspective view of another embodiment of the invention

It is contemplated that moisture removal device 10 can be sold as a kit for retrofitting to existing eyewear, and replacement shells 22, 28 may be sold separately and/or included in the kit as shown in FIG. 10. It is also contemplated that handle portion 32 may be separately sold, so that other designs, logos, or graphics may be placed on handle portion 32. Further, the kit is suitable for use on a wide range of existing objects and may be easily installed, replaced or transferred from one to another.

In the embodiment disclosed herein, magnet 18, absorber 20, and shell 22 can be secured together by virtue of shell 22 wrapping itself around absorber 20 and magnet 18. An elastic material, string, or other securing means may further secure shell 22 around absorber 20 and magnet 18. Other means of securing are also contemplated. For example, glue, tape, resilient clips, snap-on caps, and the like may be used to secure shells 22, 28 to wipers 12, 14.

Figure 9:
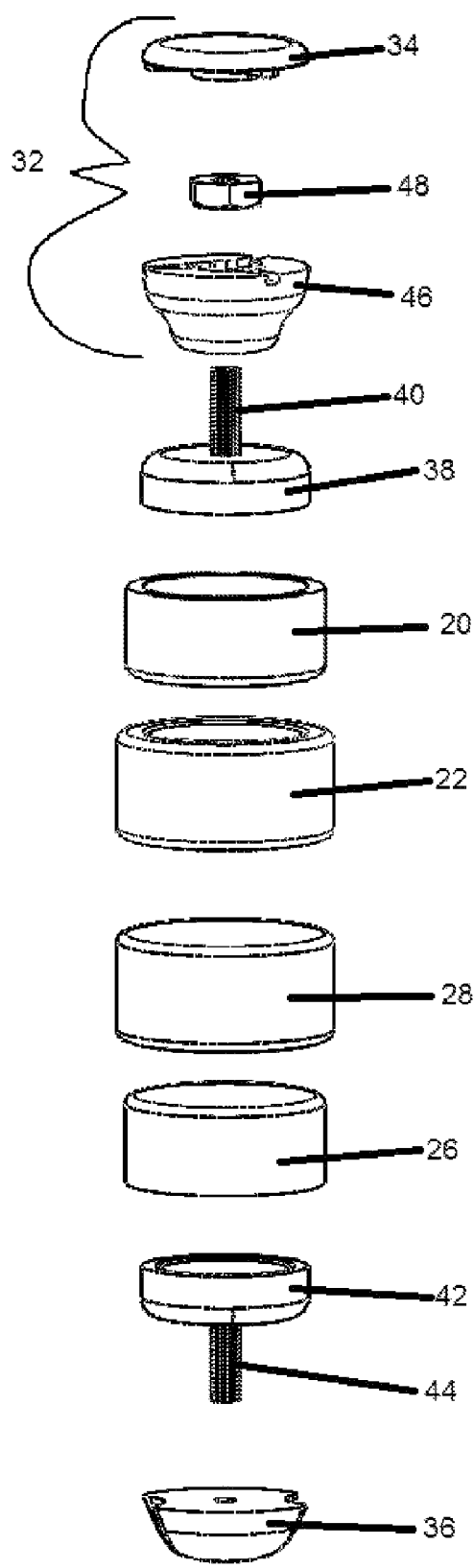
FIG. 9 is an exploded view of the embodiment shown in FIGS. 6-8.

As can be seen in FIG. 9, an exploded view illustrates how one embodiment of device 10 can be constructed. Handle portion 32 is shown to include a base 46 and a nut 48. Base 46 illustratively has a recess that is formed to receive nut 48 so that base 46 and nut 48 can be turned together to engage threaded portion 40.

It is contemplated that a user can use device 10 in the following manner. A first wiper 12 can be placed on one side/surface of object 16. Second wiper 14 is then placed on the opposite side/surface of object 16. The magnetic attraction between first and second wipers 12, 14 cause the wipers to be attracted to each other through object 16, and to align themselves with each other on opposite sides of object 16. A user may then urge one wiper, such as wiper 12, to move and can expect second wiper 14 to move with first wiper 12. To remove moisture and/or dirt or other materials, a user can simply urge first wiper 12 around the object and the shells 22, 28 on each wiper will collect the moisture or dirt. Absorbers 20, 26 will also function to absorb fluids.

It is contemplated that absorbers 20, 26 and/or shells 22, 28 may be impregnated with a substance that assists in the function of device 10. For example, a glass cleaning substance may be impregnated in one or both of the absorbers or shells such that as the device is used, the substance is activated and deposited on object 16. Such a substance may include anti-fogging, sanitizing or other components. Such a substance may also be moisture-activated. Alternatively, the absorbers 20, 26 are also capable of wicking moisture away from the shells 22, 28 and the object 16, improving the efficiency and capacity of the device 10.

Figure 11:
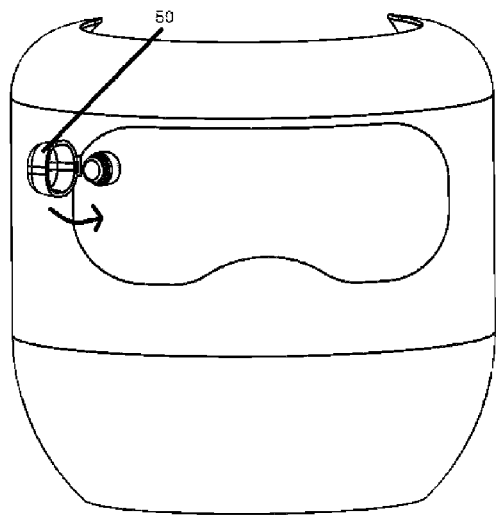
FIG. 11 is a perspective view of another embodiment of the invention
Figure 12:
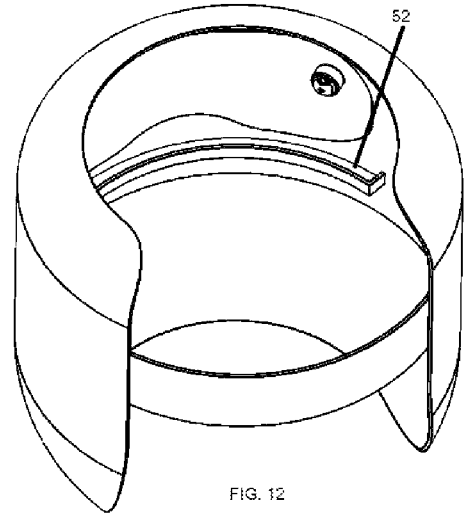
FIG. 12 is a perspective view of another embodiment of the invention
Figure 13:
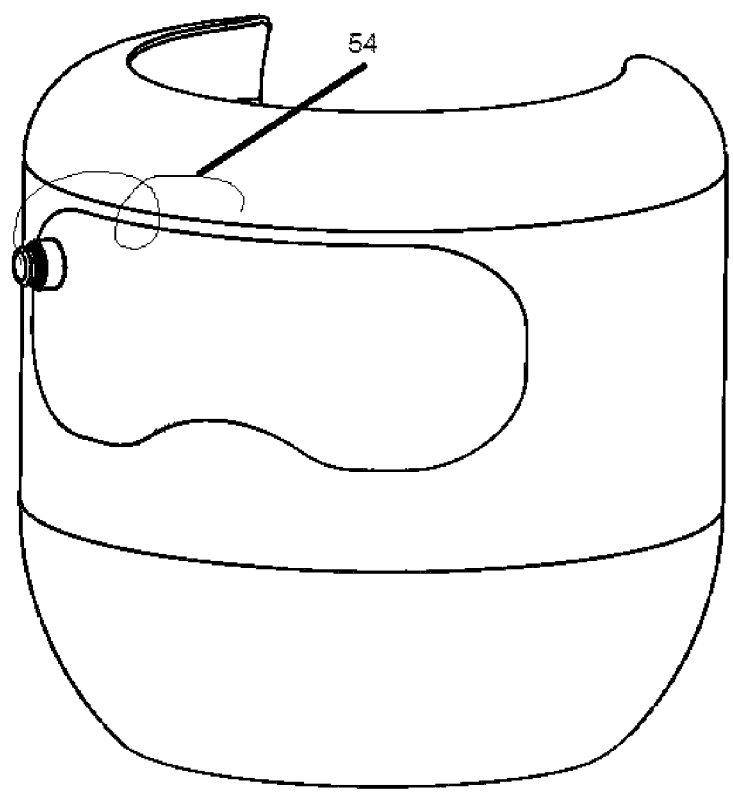
FIG. 13 is a perspective view of another embodiment of the invention

Alternate embodiments shown in FIGS. 11-13 depict features for securing the device. An outer cap 50, shown in FIG. 11 in an open configuration, secures and protects the device 10 from physical debris, damage, loss and inadvertent disassembly. The outer cap 50 may be made of any suitable material and attached via threading, glue, tape, resilient clips, snap-on caps, and the like.

A catch tray 52 may secure one wiper 12, 14 should the other be removed. The catch tray 52 shown in FIG. 12 is located on an interior surface of the object 16, though it is contemplated that such a catch tray 52 may alternately or additionally be located on the exterior surface of the object 16. FIG. 13 depicts yet another alternate embodiment in which a wiper 12, 14 is secured to the object 16 via a flexible wiper tether 54 fixed to the object 16 (a movable rigid member is also contemplated, but not shown). Alternate embodiments of the securing features having differing shapes, locations and configurations are also contemplated and alternate designs may be selected with minimal experimentation so as to best address the needs of a specific application.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

A plurality of advantages arises from the various features of the present disclosure. It will be noted that alternative embodiments of various components of the disclosure may not include all of the features described yet still benefit from at least some of the advantages of such features. Those of ordinary skill in the art may readily devise their own implementations of a moisture removal device that incorporate one or more of the features of the present disclosure and fall within the spirit and scope of the disclosure.

What is claimed is:

1. A moisture removal device having a first and second side, the moisture removal device comprising:
   a low-profile cylindrical shape for cleaning and removing moisture from eyewear while said eyewear is worn by a user;
   a first wiper having a first magnet, a first absorber, and a first shell;
   the first wiper having a low-profile cylindrical shape;
   a second wiper having a second magnet, a second absorber, and a second shell;
   the second wiper having a low-profile cylindrical shape;
   wherein the first wiper further comprises a magnet housing having a threaded portion and a handle portion that can engage the threaded portion; and wherein the first and second magnets are configured to attract each other such that the first shell and second shell face each other when applied to opposite sides of the eyewear.

2. The moisture removal device of claim 1, wherein the first wiper includes a handle portion.

3. The moisture removal device of claim 2, wherein the handle portion includes a top surface that may be imprinted with indicia.

4. The moisture removal device of claim 1, wherein the first and second shells directly contact the eyewear.

5. The moisture removal device of claim 1, wherein the first absorber and first shell are removable.

6. The moisture removal device of claim 1, wherein the first and second wiper have sufficient magnetic properties such that urging the first wiper to move will cause the second wiper to move on the eyewear.

7. The moisture removal device of claim 1, wherein the moisture removal device further consists of one of the following: an outer cap, a catch tray or a wiper tether.

8. A moisture removal device, the moisture removal device comprising:

a low-profile shape configured as a kit for retrofitting to existing eyewear for cleaning and removing moisture from both a first and second side of eyewear while said eyewear is worn by a user;

a first wiper having a first magnet, a first absorber, and a first shell;

wherein the first wiper further comprises a magnet housing having a threaded portion and a handle portion that can engage the threaded portion;

a second wiper having a second magnet, a second absorber, and a second shell;

wherein the first and second magnets are configured to attract and follow each other when applied to opposite sides of the eyewear.

9. The moisture removal device of claim 8, wherein the first and second shells are flexible, replaceable, and in direct contact with the eyewear.

10. The moisture removal device of claim 8, wherein the first and second absorbers are removable.

11. The moisture removal device of claim 8, where the first and second absorbers may remove moisture from the shells or may be impregnated with a substance for facilitating the operation of the device.

* * * * *